(12) United States Patent
Richard (10) Patent No.: US 8,661,178 B2
(45) Date of Patent: Feb. 25, 2014

(54) PCI-E SYSTEM HAVING RECONFIGURABLE LINK ARCHITECTURE

(75) Inventor: Jared Richard, Fort Collins, CO (US)

(73) Assignee: Agilent Technologies, Inc., Santa Clara, CA (US)

(*) Notice: Subject to any disclaimer, the term of this patent is extended or adjusted under 35 U.S.C. 154(b) by 168 days.

(21) Appl. No.: 13/191,892

(22) Filed: Jul. 27, 2011

(65) Prior Publication Data

US 2013/0031288 A1  Jan. 31, 2013

(51) Int. Cl.
*G06F 13/00* (2006.01)
(52) U.S. Cl.
USPC .................. 710/313; 710/104; 710/316
(58) Field of Classification Search
USPC ................ 710/104, 300, 301, 313, 316
See application file for complete search history.

(56) References Cited

U.S. PATENT DOCUMENTS

| | | | |
|---|---|---|---|
| 7,308,523 B1* | 12/2007 | Ngai | 710/313 |
| 7,363,417 B1* | 4/2008 | Ngai | 710/316 |
| 2009/0049216 A1* | 2/2009 | Atherton et al. | 710/107 |
| 2012/0066430 A1* | 3/2012 | Cooper et al. | 710/316 |
| 2012/0144087 A1* | 6/2012 | Buckland et al. | 710/316 |

OTHER PUBLICATIONS

PXI Express Specification Tutorial; National Instruments; Nov. 9, 2010.*

* cited by examiner

*Primary Examiner* — Glenn A Auve (57) ABSTRACT

A peripheral component interconnect express (PCI-E) system has a reconfigurable link architecture. The system comprises a system slot adapted to receive a PCI-E compatible system controller, a plurality of peripheral slots adapted to receive a plurality of peripheral modules, and a reconfigurable switch fabric configured to create a variable number of PCI-E links between the system slot and the plurality of peripheral slots.

16 Claims, 8 Drawing Sheets

| Pin | Z | A | B | C | D | E | F | ef | | | |
|---|---|---|---|---|---|---|---|---|---|---|---|
| 1 | GND | GA4 | GA3 | GA2 | GA1 | GA0 | GND | GND | | | |
| 2 | GND | 5Vaux | GND | SYSEN# | WAKE# | ALERT# | GND | GND | | | |
| 3 | GND | RSV | RSV | RSV | RSV | RSV | GND | GND | XP4 / XJ4 Connector | | |
| 4 | GND | RSV | RSV | RSV | RSV | RSV | GND | GND | | | |
| 5 | GND | PXI TRIG3 | PXI TRIG4 | PXI TRIG5 | GND | PXI TRIG6 | GND | GND | | | |
| 6 | GND | PXI TRIG2 | GND | RSV | PXI STAR | PXI CLK10 | GND | GND | | | |
| 7 | GND | PXI TRIG1 | PXI TRIG0 | RSV | GND | PXI TRIG7 | GND | GND | | | |
| 8 | GND | RSV | GND | RSV | RSV | PXI LBR6 | GND | GND | | | |

| Pin | A | B | C | D | E | F | ef | | | | |
|---|---|---|---|---|---|---|---|---|---|---|---|
| 1 | RSV | RSV | RSV | RSV | GA0 | RSV | GND | | | | |
| 2 | RSV | RSV | RSV | PS_ON# | GND | PWRBTN# | GND | XP3 / XJ3 Connector | | | |
| 3 | SMBDAT | SMBCLK | PWR_OK | RSVD | GND | RSVD | GND | | | | |
| 4 | RSV | PERST# | 2RefClk+ | 2RefClk- | GND | 1RefClk+ | GND | | | | |
| 5 | 1PETp0 | 1PETn0 | 1PERp0 | 1PERn0 | GND | 1PETp1 | 1PETn1 | | | | |
| 6 | 1PETp2 | 1PETn2 | 1PERp2 | 1PERn2 | GND | 1PERp1 | 1PERn1 | | | | |
| 7 | 1PETp3 | 1PETn3 | 1PERp3 | 1PERn3 | GND | 1PETp4 | 1PETn4 | | | | |
| 8 | 1PETp5 | 1PETn5 | 1PERp5 | 1PERn5 | GND | 1PERp4 | 1PERn4 | | | | |
| 9 | 1PETp6 | 1PETn6 | 1PERp6 | 1PERn6 | GND | 1PETp7 | 1PETn7 | | | | |
| 10 | 2PETp0 | 2PETn0 | 2PERp0 | 2PERn0 | GND | 1PERp7 | 1PERn7 | | | | |

| Pin | A | B | C | D | E | F | ef | | | | |
|---|---|---|---|---|---|---|---|---|---|---|---|
| 1 | 2PETp1 | 2PETn1 | 2PERp1 | 2PERn1 | GND | 2PETp2 | 2PETn2 | | | | |
| 2 | 2PETp3 | 2PETn3 | 2PERp3 | 2PERn3 | GND | 2PERp2 | 2PERn2 | | | | |
| 3 | 2PETp4 | 2PETn4 | 2PERp4 | 2PERn4 | GND | 2PETp5 | 2PETn5 | XP2 / XJ2 Connector | | | |
| 4 | 2PETp6 | 2PETn6 | 2PERp6 | 2PERn6 | GND | 2PERp5 | 2PERn5 | | | | |
| 5 | 2PETp7 | 2PETn7 | 2PERp7 | 2PERn7 | GND | 2PETp8 | 2PETn8 | | | | |
| 6 | 2PETp9 | 2PETn9 | 2PERp9 | 2PERn9 | GND | 2PERp8 | 2PERn8 | | | | |
| 7 | 2PETp10 | 2PETn10 | 2PERp10 | 2PERn10 | GND | 2PETp11 | 2PETn11 | | | | |
| 8 | 2PETp12 | 2PETn12 | 2PERp12 | 2PERn12 | GND | 2PERp11 | 2PERn11 | | | | |
| 9 | 2PETp13 | 2PETn13 | 2PERp13 | 2PERn13 | GND | 2PETp14 | 2PETn14 | | | | |
| 10 | 2PETp15 | 2PETn15 | 2PERp15 | 2PERn15 | GND | 2PERp14 | 2PERn14 | | | | |

| Pin | | | | | | | | | | | |
|---|---|---|---|---|---|---|---|---|---|---|---|
| G | GND | | | | | | | | | | |
| F | 12V | | | | | | | | | | |
| E | 12V | | | | | | | | | | |
| D | GND | | | | | | | XP1 / XJ1 Connector | | | |
| C | 5V | | | | | | | | | | |
| B | 3.3V | | | | | | | | | | |
| A | GND | | | | | | | | | | |

Fig. 5

| Pin | A | B | C | D | E | F | | | XP3 / XJ3 Connector | | | | | XP2 / XJ2 Connector | | |
|---|---|---|---|---|---|---|---|---|---|---|---|---|---|---|---|---|
| | Z | | | | | | | | | | | | | | | |
| 1 | GA4 | GA3 | GA2 | GA1 | GA0 | GND | | | | | | | | | | |
| 2 | 5Vaux | GND | SYSEN# | WAKE# | ALERT# | GND | | | | | | | | | | |
| 3 | RSV | RSV | RSV | RSV | RSV | GND | | | | | | | | | | |
| 4 | RSV | RSV | RSV | RSV | RSV | GND | | | | | | | | | | |
| 5 | PXITRIG3 | PXITRIG4 | PXITRIG5 | GND | PXITRIG6 | GND | | | | | | | | | | |
| 6 | PXITRIG2 | GND | RSV | PXISTAR | PXICLK10 | GND | | | | | | | | | | |
| 7 | PXITRIG1 | PXITRIG0 | RSV | GND | PXITRIG7 | GND | | | | | | | | | | |
| 8 | RSV | GND | RSV | RSV | PXILBR6 | GND | | | | | | | | | | |

XP4 / XJ4 Connector

| Pin | A | B | C | D | E | F | ef |
|---|---|---|---|---|---|---|---|
| 1 | RSV | RSV | RSV | RSV | GND | RSV | GND |
| 2 | RSV | GND | PWR_OK | PS_ON# | GND | LINKCAP | PWRBTN# |
| 3 | SMBDAT | SMBCLK | RSVD | RSVD | GND | RSVD | GND |
| 4 | RSV | PERST# | 2RefClk+ | 2RefClk- | GND | 1RefClk+ | 1RefClk- |
| 5 | 1PETp0 | 1PETp0 | 1PERp0 | 1PERn0 | GND | 1PETp1 | 1PETn1 |
| 6 | 1PETp1 | 1PETn2 | 1PERp2 | 1PERn2 | GND | 1PERp1 | 1PERn1 |
| 7 | 1PETp2 | 1PETn3 | 1PERp3 | 1PERn3 | GND | 2PERp0 | 2PERn0 |
| 8 | 1PETp3 | 2PETn1 | 2PERp1 | 2PERn1 | GND | 2PETp0 | 2PETn0 |
| 9 | 2PETp2 | 2PETn2 | 2PERp2 | 2PERn2 | GND | 2PERp3 | 2PERn3 |
| 10 | 3PETp0 | 3PETn3 | 3PERp0 | 3PERn3 | GND | 2PERp3 | 2PERn3 |

| Pin | A | B | C | D | E | F | ef |
|---|---|---|---|---|---|---|---|
| 1 | 3PETp1 | 2PETn1 | 3PERp1 | 3PERn1 | GND | 2PETp2 | 2PETn2 |
| 2 | 3PETp3 | 2PETn3 | 3PERp3 | 3PERn3 | GND | 2PETp2 | 2PETn2 |
| 3 | 4PETp0 | 2PETn4 | 4PERp0 | 4PERn0 | GND | 2PETp5 | 2PETn5 |
| 4 | 4PETp2 | 2PETn6 | 4PERp2 | 4PERn2 | GND | 2PERp5 | 2PERn5 |
| 5 | 4PETp3 | 2PETn7 | 4PERp3 | 4PERn3 | GND | RSV | RSV |
| 6 | RSV | RSV | RSV | RSV | GND | RSV | RSV |
| 7 | RSV | RSV | RSV | RSV | GND | RSV | RSV |
| 8 | RSV | RSV | RSV | RSV | GND | RSV | RSV |
| 9 | RSV | RSV | RSV | RSV | GND | RSV | RSV |
| 10 | RSV | RSV | RSV | RSV | GND | RSV | RSV |

XP1 / XJ1 Connector

| Pin | |
|---|---|
| G | GND |
| F | 12V |
| E | 12V |
| D | GND |
| C | 5V |
| B | 3.3V |
| A | GND |

PCI-E SYSTEM HAVING RECONFIGURABLE LINK ARCHITECTURE

BACKGROUND

Peripheral component interconnect express (PCI-E) is a standard for incorporating peripheral devices in computing systems. The standard defines physical and logical interfaces and protocols for communication with PCI-E compatible devices. PCI-E is commonly used in consumer and industrial applications as a motherboard level interconnect, a passive backplane interconnect, and an expansion card interface.

Through the use of PCI-E switches, a host system or embedded processor can be connected to an arbitrary number of PCI-E compatible peripheral devices in a tree topology. As an example, in a typical PCI-E tree, a host processor is connected to a root complex having one or more PCI-E ports. Each PCI-E port is connected to a peripheral device or a PCI-E switch, and each PCI-E switch is connected to multiple PCI-E slots. The PCI-E slots each receive a peripheral device or a PCI-E cable card connected to another downstream PCI-E switch.

The flexible nature of the tree topology allows end-users and system integrators to customize many aspects of an individual system. However, it can also lead to performance issues such as communication bottlenecks, data collisions, and so on. As an example, suppose a PCI-E switch is connected to multiple slots each having a peripheral device. The peripheral devices must compete with each other for input/output bandwidth of the switch. In addition, the peripheral devices must compete with other peripheral devices for host processor bandwidth. These and other performance issues place practical limitations on the flexibility of the PCI-E standard.

These performance issues also apply to standards based on PCI-E, such as compact PCI-E (cPCI-E), which provides a ruggedized version of PCI-E, and PCI-E eXtensions for instrumentation (PXI-E), which adapts PCI-E for test and measurement applications.

What is needed, therefore, are new techniques and technologies for maintaining both flexibility and performance in systems using PCI-E based interconnections.

SUMMARY

In accordance with a representative embodiment, a peripheral component interconnect express (PCI-E) system having a reconfigurable link architecture, comprising: a system slot adapted to receive a PCI-E compatible system controller; a plurality of peripheral slots adapted to receive a plurality of peripheral modules; and a reconfigurable switch fabric configured to create a variable number of PCI-E links between the system slot and the plurality of peripheral slots.

In accordance with another representative embodiment, a method of configuring a peripheral component interconnect express (PCI-E) compatible chassis comprising multiple PCI-E switches configured to establish PCI-E links between a system slot and multiple peripheral slots is described. The method comprises: determining a number of PCI-E links to establish between the system slot and the multiple peripheral slots; partitioning at least one of the multiple PCI-E switches upon determining that the link configuration requires a number of PCI-E links greater than the number of PCI-E switches; and loading switch images to the PCI-E switches based on the determined number of PCI-E links.

BRIEF DESCRIPTION OF THE DRAWINGS

The described embodiments are best understood from the following detailed description when read with the accompanying drawing figures. Wherever applicable and practical, like reference numerals refer to like elements.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

As used in the specification and appended claims, the terms 'a', 'an' and 'the' include both singular and plural referents, unless the context clearly dictates otherwise. Thus, for example, 'a device' includes one device and plural devices.

As used in the specification and appended claims, and in addition to their ordinary meanings, the terms 'substantial' or 'substantially' mean to within acceptable limits or degree.

As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

The representative embodiments relate generally to PCI-E systems having a reconfigurable link architecture. For example, in certain embodiments described below, a PCI-E system takes the form of a PXI-E chassis comprising a reconfigurable switch fabric connected between a system slot and a plurality of peripheral slots. The system slot is configured to receive a system controller providing an input/output interface to the PXI-E chassis and controlling operation of peripheral modules in PXI-E chassis. The peripheral slots are configured to receive the peripheral modules, which are typically compatible with PCI-E, PCI, or another standardized interconnect. The PXI-E chassis can be configured to operate in a 2-link mode or a 4-link mode by selectively loading a 2-link switch image or a 4-link switch image to the switch fabric, and dynamically controlling a LINKCAP pin connected to the system controller according to the 2-link mode or the 4-link mode.

These and other embodiments provide more flexibility than conventional chassis implementations in which 2-link and 4-link switch configurations require different hardware. This added flexibility allows a single chassis to be compatible with a greater number of module and controller offerings on the market. It also removes bandwidth restriction of current 4-link designs and allows the use of 8-lane wide PCI-E peripheral modules while maintaining the ability to use 4-link based system controllers.

Figure 1:
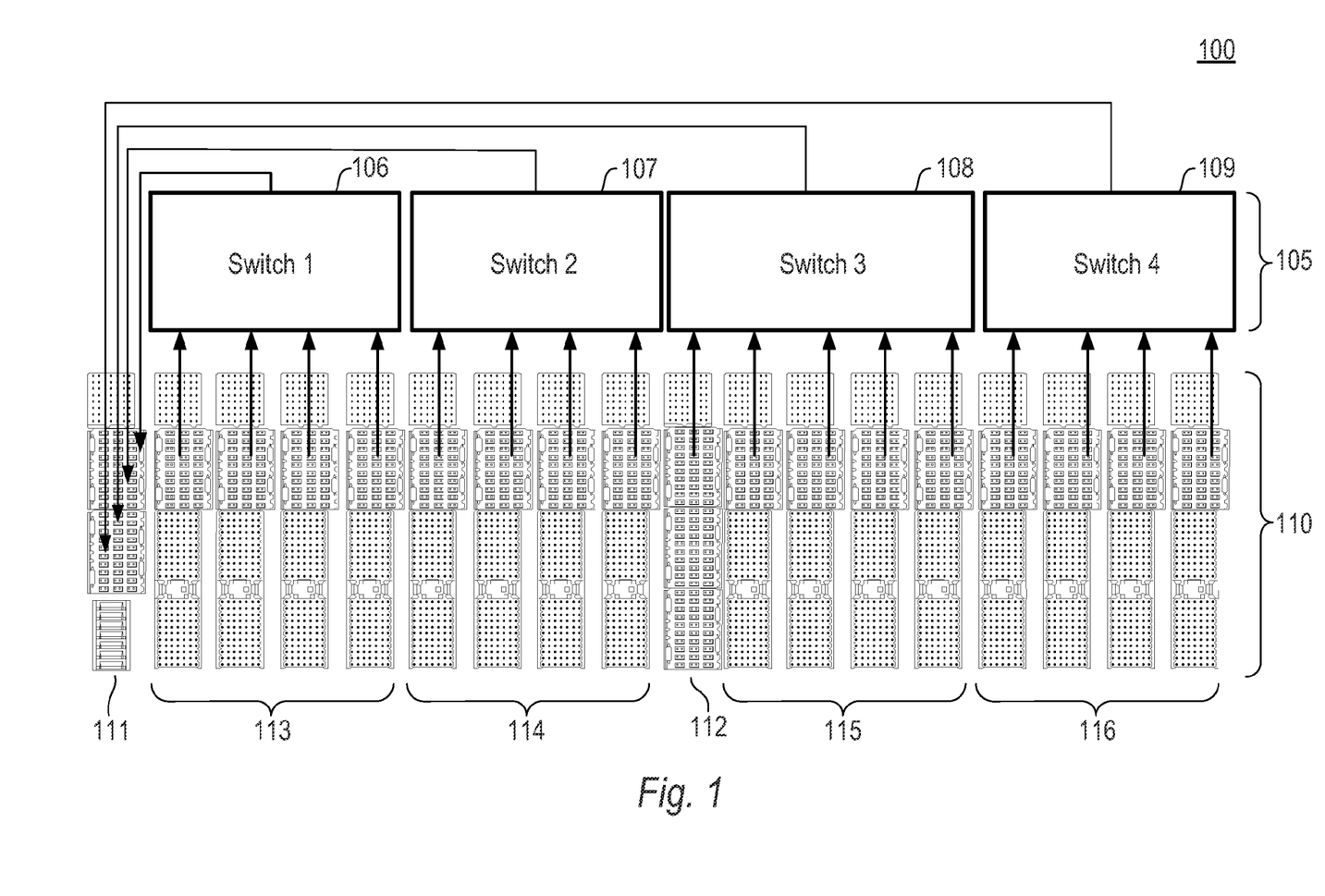
FIG. 1 is a diagram illustrating a PXI-E chassis in a 4-link configuration in accordance with a representative embodiment.

FIG. 1 is a diagram illustrating a PXI-E chassis 100 in a 4-link configuration in accordance with a representative embodiment. These four links are created by four switches between a system slot and a plurality of peripheral slots.

Referring to FIG. 1, PXI-E chassis 100 comprises a PCI-E switch fabric 105 and a plurality of module slots 110. The PCI-E switch fabric 105 comprises first through fourth PCI-E switches 106 through 109, and module slots 110 comprise a system slot 111 (also referred to as an upstream host for other slots), a timing slot 112, and peripheral slot segments 113 through 116 each comprising multiple peripheral slots capable of peer-to-peer communication.

Each of the first through fourth PCI-E switches 106 through 109 provides a 4-lane (×4) connection to system slot 111, and each of the peripheral slots provides at least a 1-lane connection to one of the corresponding first through fourth PCI-E switches 106 through 109. For instance, the peripheral slots in peripheral slot segment 113 may provide one 8-lane connection and three 4-lane connections to PCI-E switch 106.

The 4-link configuration has various shortcomings that can limit the performance of PXI-E chassis 100. In particular, the 4-link configuration creates a 4-lane bottleneck between system slot 111 and each of first through fourth PCI-E switches 106 through 109. In other words, it requires the peripheral slots to compete for four lanes of bandwidth to system slot 111. The 4-link configuration also prevents PXI-E chassis 100 from using an 8-lane or 16-lane connection to system slot 111 by limiting all of the links back to system slot 111 to 4-lanes. Finally, the 4-link configuration requires peer-to-peer data from different switch segments to be connected through an external switch, which increases the latency of those communications.

Due to the 4-lane bottleneck between system slot 111 and first through fourth PCI-E switches 106 through 109, each of the peripheral slots is limited to a maximum theoretical throughput 1 GB/s at Gen1 PCI-E speeds. In addition, system slot 111 is only able to take advantage of 4 GB/s of controller bandwidth.

Some of the above shortcomings can be overcome by using a 2-link configuration in which the peripheral slots are connected to system slot 111 by two links, the first being capable of up to 8 lanes and the second being capable of up to 16 lanes. However, conventional chassis implementations do not allow the 2-link configuration to be implemented in the same chassis as the 4-link configuration. In other words, in conventional implementations, the 2-link and 4-link configurations require different hardware implementations that are mutually exclusive. Consequently, adoption of the 2-link or 4-link configuration prevents certain features of the other configuration from being used, and it can preclude compatibility with modules designed for the other configuration. For instance, a 2-link system controller may be incompatible with a system designed uniquely for the 4-link configuration, and vice versa.

Figure 2:
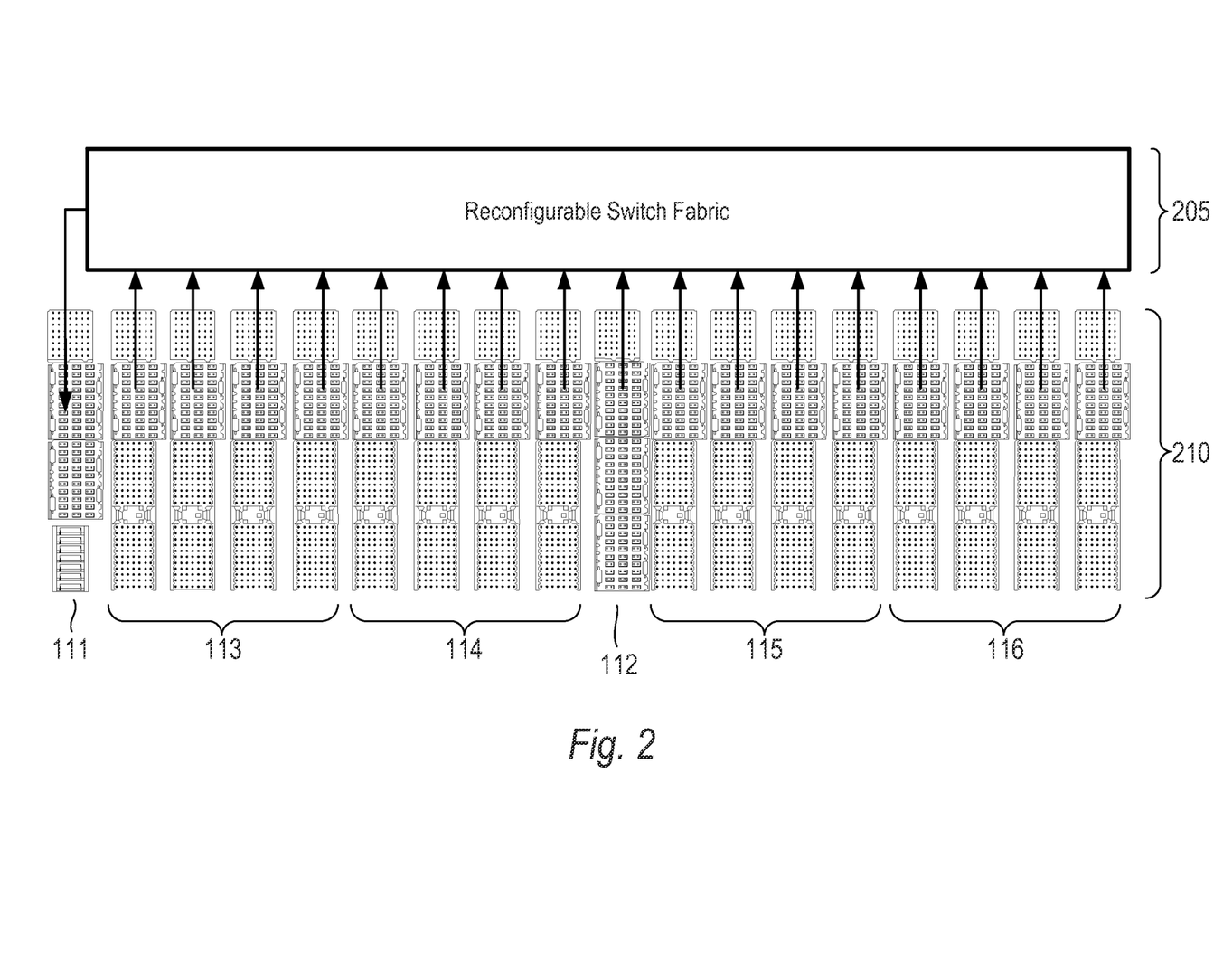
FIG. 2 is a diagram illustrating a PXI-E chassis comprising a reconfigurable switch fabric in accordance with a representative embodiment.

FIG. 2 is a diagram illustrating a PXI-E chassis 200 comprising a reconfigurable switch fabric in accordance with a representative embodiment. The reconfigurable switch fabric can be used to implement both a 2-link configuration and a 4-link configuration in the same PXI-E chassis.

Referring to FIG. 2, PXI-E chassis 200 comprises a reconfigurable switch fabric 205 and a plurality of module slots 210. Module slots 210 are substantially the same as module slots 110 of FIG. 1, so a further description of these slots will be omitted in order to avoid redundancy.

Reconfigurable switch fabric 205 is typically implemented by PCI-E switches that can be reconfigured using one or more switch images stored in a non-volatile memory such as an electrically erasable programmable read only memory (EEPROM). One of the switch images can be loaded into reconfigurable switch fabric 205 during booting of PXI-E chassis 200 according to a user selection. The user selection can be made by a user according to the requirements of a current application. For example, in applications where peer-to-peer communication is required between a relatively large number of modules, the 2-link configuration may be desirable because it can form larger segments of peripheral slots.

In addition, reconfigurable switch fabric 205 can be reconfigured as required for compatibility with numerous existing types of system controllers and peripheral modules. For example, a user having a 4-link system controller can configure PXI-E chassis 200 to operate in the 4-link configuration.

In the 2-link configuration, reconfigurable switch fabric 205 provides each switch link with up to 8-lanes, for link 1, and 16 lanes, for link 2, of communication to system slot 111. Accordingly, it expands the available input/output bandwidth available to each peripheral slot. In addition, in the 2-link configuration, reconfigurable switch fabric 205 creates links that correspond to larger peripheral slot segments than the 4-link configuration. This allows a larger number of peripheral slots to communicate with each other in a peer-to-peer fashion without transferring data to an upstream host processor or switch. This can reduce a processing burden on the host processor and reduce latency of the peer-to-peer communication.

Figure 3:
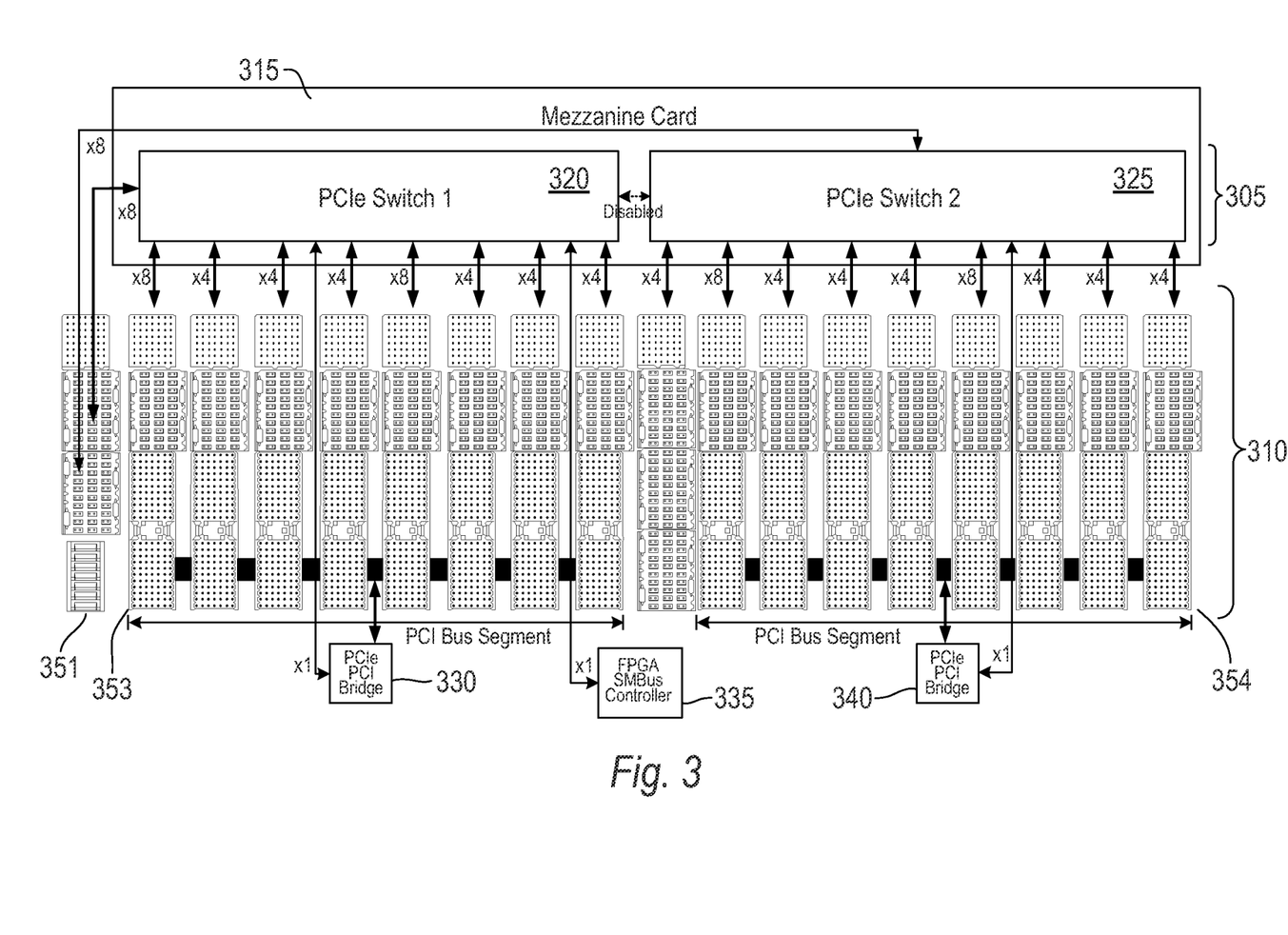
FIG. 3 is a diagram illustrating a PXI-E chassis in a 2-link configuration in accordance with a representative embodiment.

FIG. 3 is a diagram illustrating a PXI-E chassis 300 in a 2-link configuration in accordance with a representative embodiment.

Referring to FIG. 3, PXI-E chassis 300 comprises a switch fabric 305, a plurality of module slots 310, and controlling logic such as PCI-E to PCI bridges 330 and 340, and an FPGA SMBus controller 335.

In some embodiments, PXI-E chassis 300 is implemented in a standalone configuration comprising an embedded controller. This can provide flexibility and reduce latency in peer-to-peer communications. In other embodiments, PXI-E chassis 300 is implemented in the context of a larger system such as a personal computer (PC) having a system level host processor. In these embodiments, PXI-E chassis 300 can be connected to an upstream switch or the root complex through a cabled PCI-E card, for example.

Switch fabric 305 comprises two PCI-E switches 320 and 325 mounted on a mezzanine card 315. Mezzanine card 315 typically comprises a printed circuit board (PCB) separate from that used to host other components of PXI-E chassis 300. For instance, PXI-E chassis 300 can comprise one PCB for connectors and control logic associated with module slots 310, and another PCB for switch fabric 305. The use of mezzanine card 315 allows a relatively large number of connectors, integrated circuits (ICs), and signal lines to be incorporated in PXI-E chassis 300. This can be useful, for instance by allowing module slots 310 to be formed of all hybrid slots.

PCI-E switch 320 is connected between system slot 351 and peripheral slots 353, and PCI-E switch 325 is connected between system slot 351 and peripheral slots 354, which include a timing slot that can be used as a PCI-E peripheral. Each of PCI-E switches 320 and 325 provides an 8-lane connection to system slot 351, which allows the corresponding peripheral slots to use a greater amount of communication bandwidth and system controller bandwidth.

PCI-E switches 320 and 325 are designed to be reconfigurable so that they can function as one or two logical switches, the combination of which creates either 2 or 4 Links from the system controller slot. For instance, in a configuration shown in FIG. 4, PCI-E switches 320 and 325 are partitioned to operate as four logical switches.

In some embodiments, PCI-E switches 320 and 325 can be implemented by off the shelf components. For instance, one or more of these switches could take the form of a 64-lane IC switch manufactured by Integrated Device Technologies (IDT) and having the model number PES89H64H16AG2. This switch can be programmed or reprogrammed externally by using software to update its configuration or to modify a corresponding switch image stored in an EEPROM. In addition, more than one EEPROM can be used to store switch images for a single switch. For instance, two EEPROMS can be used to store different switch images for the 2-link and 4-link configurations of PXI-E chassis 300.

As an alternative to using reconfigurable switches, PXI-E chassis 300 could be designed to selectively create two or four PCI-E links between system slot 351 and the peripheral slots by performing lane multiplexing throughout the chassis. This technique, however, tends to be more complicated than using reconfigurable switches.

Module slots 310 include system slot 351, a timing slot 352, and peripheral slots 353 and 354. System slot 351 comprises a connector for power, another connector for PCI-E and an instrument specific connector. Peripheral slots 353 and 354 are hybrid slots, so each one comprises a 32-bit PCI connector, a PCI-E connector, and a connector for instrument functions such as taps, triggers, and clocks. Timing slot 352 comprises a connector for providing timing signals as well as a connectivity as a PXI-E peripheral slot.

The design of the connectors in module slots 310 is dictated by the PXI-E specification. However, the overall connector configuration of PXI-E chassis 300 is unique because the peripheral slots have all hybrid connectors. This "all hybrid" configuration adds flexibility to PXI-E chassis 300 by allowing each slot to connect to various PCI and PCI-E modules. In contrast, no conventional large slot count PXI-E chassis includes all hybrid slots because of space constraints and other factors.

When PXI-E chassis 300 is in the 2-link configuration of FIG. 3, a LINKCAP pin of system slot 351 is controlled to indicate this configuration to a system controller. Conventionally, the LINKCAP pin is either hardwired to a high voltage or floated to indicate the 2-link configuration or the 4-link configuration. However, to allow dynamic reconfiguration of PXI-E chassis 300, the LINKCAP pin may be controlled by a flexible mechanism, such as a mechanical jumper, or a simple CPLD or FPGA controller that can be programmed by software. For instance, in the embodiment of FIGS. 3 and 4, the LINKCAP pin is controlled by FPGA SMBus controller 335.

PCI-E to PCI bridges 330 and 340 are used to route signals from PCI based peripheral modules to PCI-E switches 320 and 325. As illustrated in FIG. 3, these bridges are connected between peripheral slots 353 and 354 and PCI-E switches 320 and 325 through a PCI bus.

Figure 4:
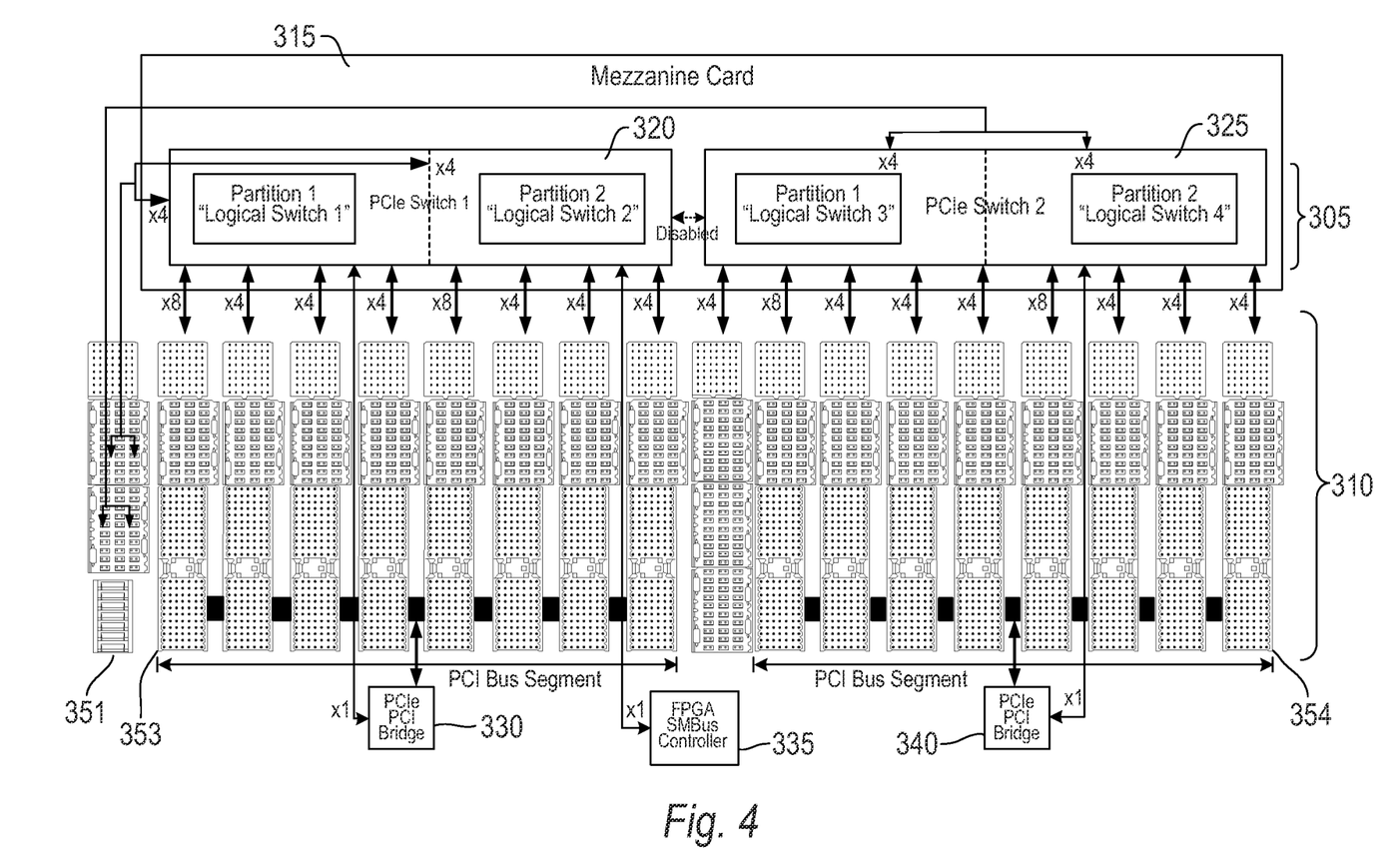
FIG. 4 is a diagram illustrating a PXI-E chassis in a 4-link configuration in accordance with a representative embodiment.

FIG. 4 is a diagram illustrating PXI-E chassis 300 in a 4-link configuration in accordance with a representative embodiment.

The 4-link configuration is achieved by partitioning PCI-E switches 320 and 325 to define four logical switches, and loading a switch image from a nonvolatile memory into each of PCI-E switches 320 and 325. The partitioning is typically performed using a partitioning function built into PCI-E switches 320 and 325. The locations of the partitions shown in FIG. 4 represent one of many ways to partition the switches, which can be partitioned along any boundary between connectors, and not just the illustrated dotted line. In other words, the partitioning could be used to create module segments of any user-defined width.

Figure 5:
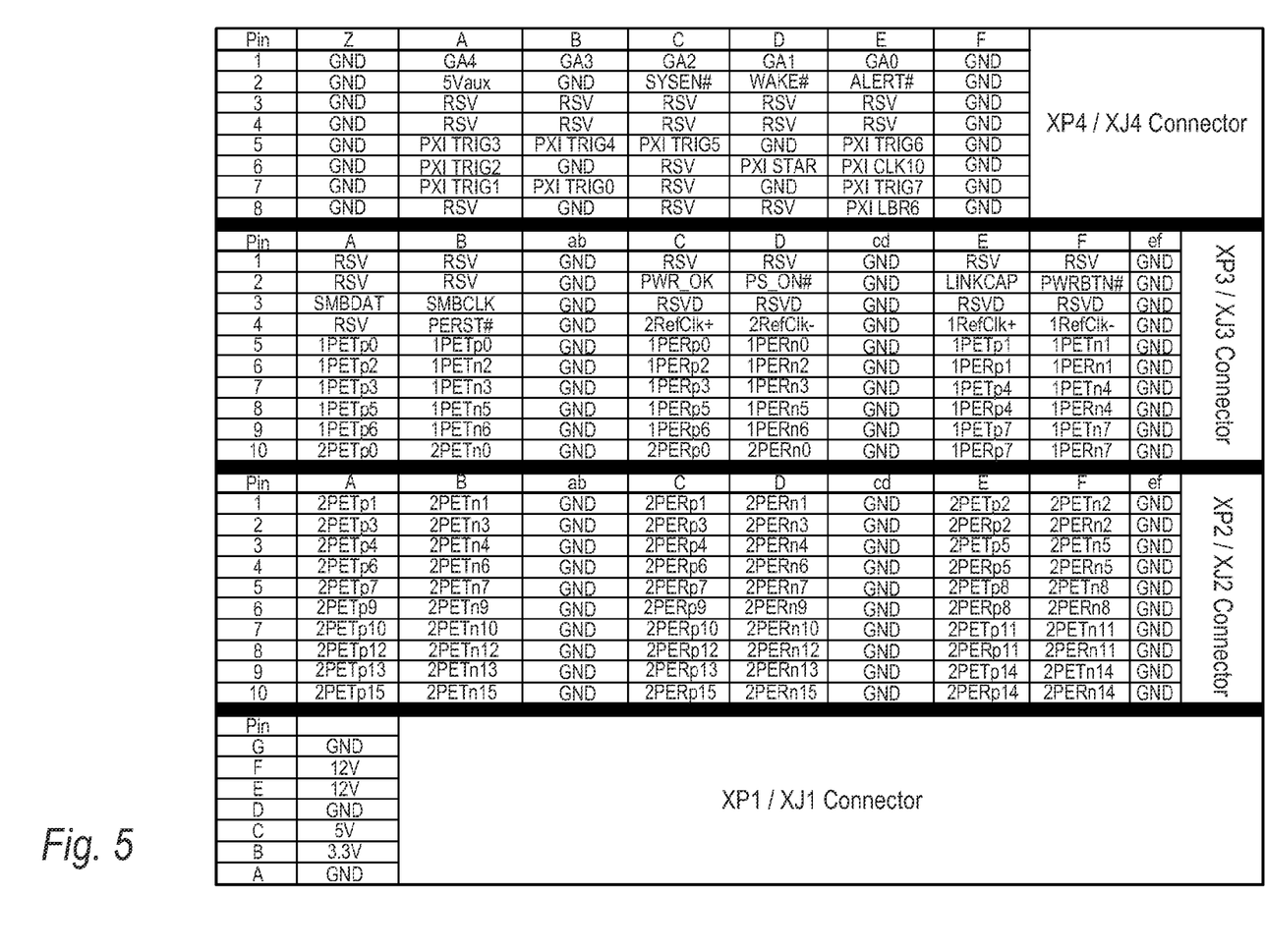
FIG. 5 is a table showing pin assignments of a system connector in the embodiments of FIGS. 3 and 4 in accordance with a representative embodiment.

FIG. 5 is a table showing pin assignments of a system connector in the embodiment of FIG. 3 in accordance with a representative embodiment. In other words, FIG. 5 shows the pin assignments of system slot 351 when PXI-E chassis is in the 2-link configuration.

Referring to FIG. 5, system slot 351 comprises four connectors labeled XP4/XJ4, XP3/XJ3, XP2/XJ2, and XP1/XJ1, shown from top to bottom in the table. The XP4/XJ4 connector is for instrumentation specific signals, the XP3/XJ3 and XP2/XJ2 connectors are for PCI-E signals, and the XP1/XJ1 connector is for power. The pin assignments of each of these connectors are determined by the PXI-E specification.

As illustrated by the table in FIG. 5, two links are created through the XP3/XJ3 and XP2/XJ2 connectors. In particular, a first link is created through pins labeled with the prefix 1PET, and a second link is created through pins labeled with the prefix 2PET. In addition, the above-mentioned LINKCAP pin is located at pin 2E of the XP3/XJ3 connector. The LINKCAP pin is controlled to indicate the configuration of PXI-E chassis 300 to a system controller located in system slot 351.

Figure 6:
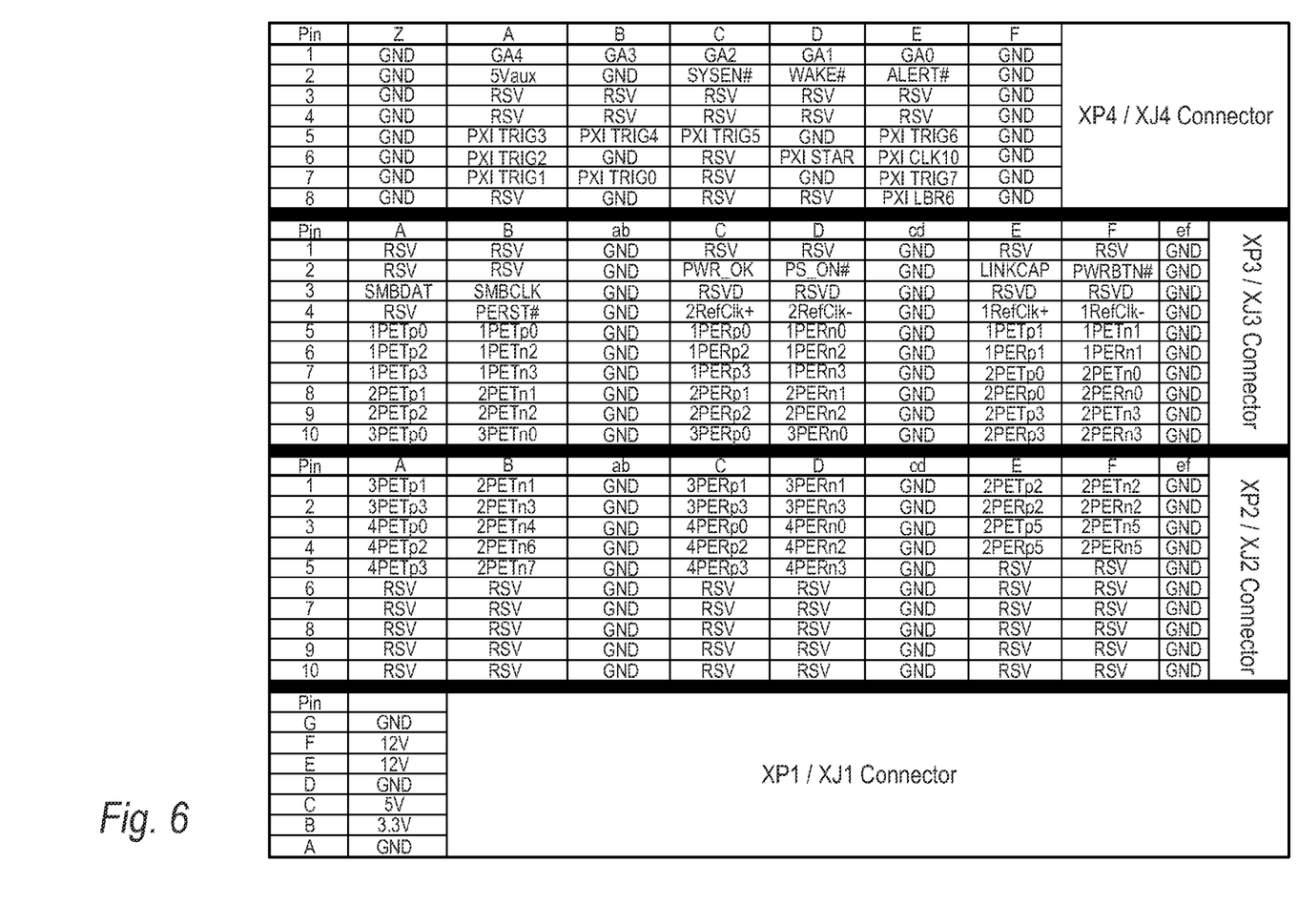
FIG. 6 is a table showing pin assignments of a system connector in the embodiment of FIG. 4 in accordance with a representative embodiment.

FIG. 6 is a table showing pin assignments of a system connector in the embodiment of FIG. 4 in accordance with a representative embodiment. In other words, FIG. 6 shows the pin assignments of system slot 351 when PXI-E chassis is in the 4-link configuration.

As illustrated by the table in FIG. 6, four links are created through the XP3/XJ3 and XP2/XJ2 connectors. In particular, a first link is created through pins labeled with the prefix 1PET, a second link is created through pins labeled with the prefix 2PET, a third link is created through pins labeled with the prefix 3PET, and a fourth link is created through pins labeled with the prefix 4PET.

Figure 7:
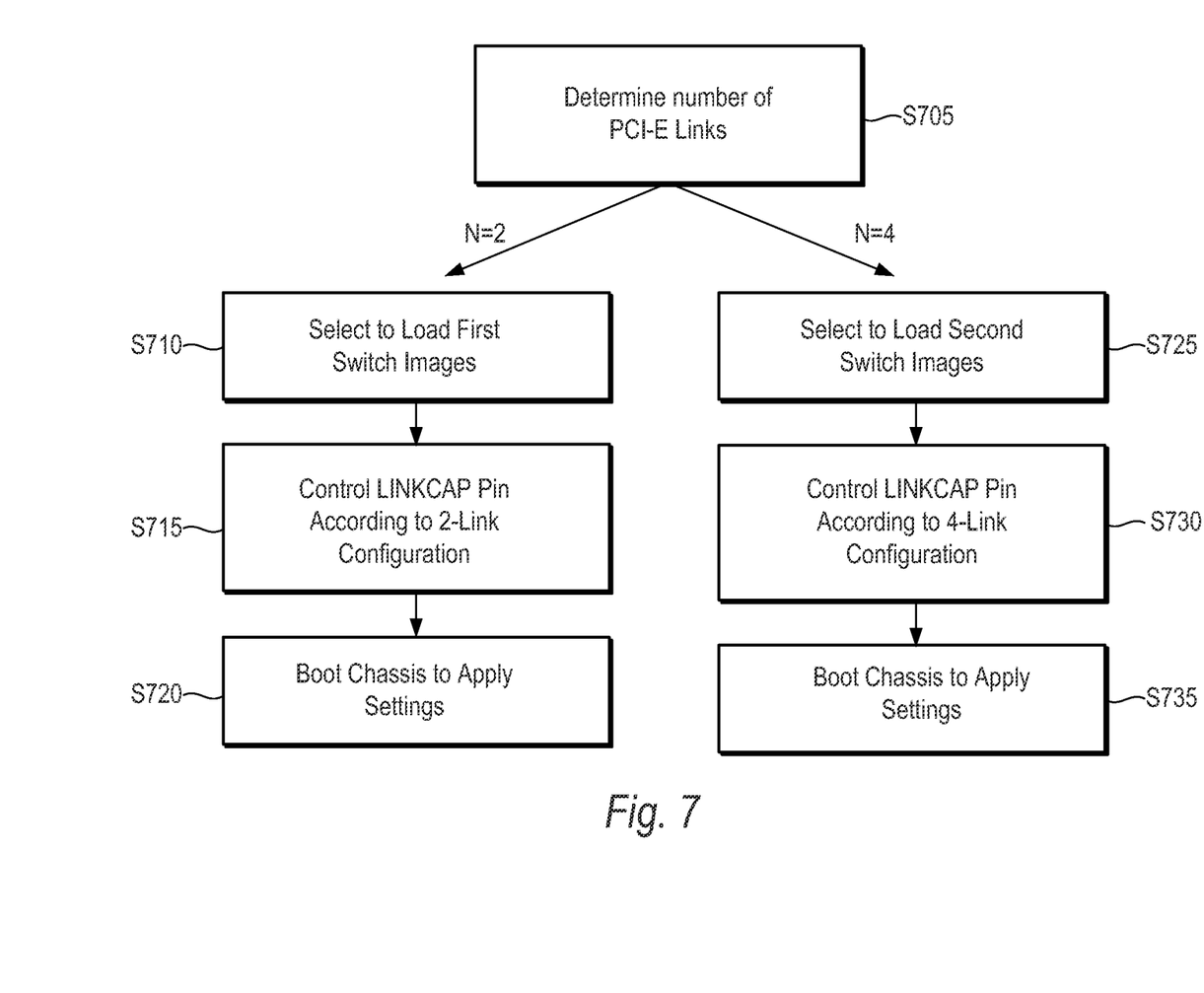
FIG. 7 is a flowchart illustrating a method of configuring a PXI-E chassis in accordance with a representative embodiment.

FIG. 7 is a flowchart illustrating a method of configuring a PXI-E chassis in accordance with a representative embodiment. For convenience, this method will be described with reference to PXI-E chassis 300 of FIGS. 3 and 4. However, the method could be performed in other types of chassis or in a PCI-E based system other than a PXI-E chassis.

Referring to FIG. 7, the method begins by determining a number of PCI-E links to be routed from system slot 351 of PXI-E chassis 300 to peripheral slots 353 and 354 (S705). Upon determining that the number of PCI-E links is two (N=2), the method selects to load a first set of switch images to PCI-E switches 320 and 325 (S710), and controls the LINKCAP pin of system slot 351 to indicate that PXI-E chassis 300 is in the 2-link configuration (S715). Thereafter, the method boots PXI-E chassis 300 to apply the selected settings (S720). The first set of switch images defines the 2-link configuration of FIG. 3 in which PCI-E switches 320 and 325 each function as one switch.

Upon determining that the number of PCI-E links is four (N=4), the method selects to load second switch images into PCI-E switches 320 and 325 (S725). Partitioning of these switches is performed as part of the loading of the switch images. Next, the method controls the LINKCAP pin of system slot 351 to indicate that PXI-E chassis 300 is in the 4-link configuration (S730). Thereafter, the method boots PXI-E chassis 300 to apply the selected settings (S735). The second set of switch images defines the 4-link configuration of FIG. 4 in which PCI-E switches 320 and 325 each function as two logical switches.

As an alternative to loading the first or second set of switch images, the method could control a set of multiplexers to selectively route signals between system slot 351 and the peripheral slots in a 2-link or 4-link configuration. In this alternative, the multiplexers could be controlled by a single signal indicating the 2-link or 4-link configuration.

Figure 8:
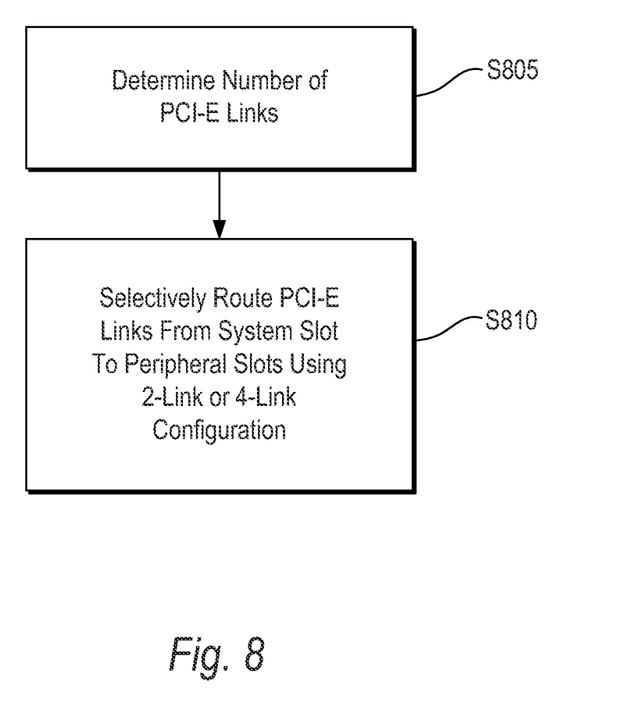
FIG. 8 is a flowchart illustrating a method of operating a PXI-E chassis in accordance with a representative embodiment.

FIG. 8 is a flowchart illustrating a method of operating a PXI-E chassis in accordance with a representative embodiment. For convenience, this method will be described with reference to PXI-E chassis 300 of FIGS. 3 and 4. However, the method could be performed in other types of chassis, or in a PCI-E based system other than a PXI-E chassis.

Referring to FIG. 8, the method begins by determining a number of PCI-E links to be routed from system slot 351 of PXI-E chassis 300 to peripheral slots 353 and 354 (S805). Thereafter, the method selectively routes PCI-E links from system slot 351 to peripheral slots 353 and 354 using the 2-link or 4-link configuration (S810).

The above-described embodiments can be used to operate a wide variety of peripheral devices, such as various forms of test equipment. For example, virtually any type of PCI-E or PCI compatible box instrument can be plugged into a module slot of PXI-E chassis 300. Examples of compatible test equipment include various software-controlled instruments such as an arbitrary waveform generator, a digital multi-meter (DMM), or an oscilloscope.

In general, the above instruments may require host processor intervention to control or interact with their software. However, as an alternative to the host processor, some embodiments use an embedded processor, such as a PC in a small form factor. Moreover, the embedded processor can be used in conjunction with an FPGA co-processor. For instance, in one embodiment, a vector signal analyzer (VSA) and an FPGA co-processor are placed in the peripheral slots of PXI-E chassis 300. The VSA comprises a local oscillator, multiple down converters, and a digitizer, occupying five peripheral slots. The FPGA co-processor is placed in another peripheral slot next to the VSA, and the VSA can stream data to the FPGA through a shared switch without traveling to a host processor. This configuration can reduce latency of the data streaming and also reduce the amount of processing performed by the host processor.

A variety of similar applications can be created by coupling a co-processor and various instruments to each other through a common switch. In general, the 2-link configuration has a larger number of peripheral slots for each switch, so it enables a wider range of peer-to-peer type applications than the 4-link configuration.

In certain alternative embodiments, a single large switch can be configured with enough ports to cover an entire chassis. For instance, one large switch could be partitioned into 2 or 4 logical switches in place of the 2 switch design described above.

In addition to the above-described benefits, certain embodiments offer complete backward compatibility with existing system controllers and peripheral modules. For instance, they may be compatible with current 4-Link controllers via a segmented switch topology and direct-link topologies. They may also be compatible with common or unique 2-link controller designs. Moreover, certain embodiments can be reconfigured to emulate other chassis designs to achieve compatibility.

As indicated above, certain embodiments can achieve higher bandwidth through a system slot by using 8-lane PCI-E links. This in turn can reduce a bottleneck for peripheral devices. In addition, using a 2-link system controller can increase the size of segmented switch regions, which can provide a greater amount of peer-to-peer communication.

While example embodiments are disclosed herein, one of ordinary skill in the art appreciates that many variations that are in accordance with the present teachings are possible and remain within the scope of the appended claims. The invention therefore is not to be restricted except within the scope of the appended claims.

What is claimed is:

1. A peripheral component interconnect express (PCI-E) system having a reconfigurable link architecture, comprising:
 a system slot adapted to receive a PCI-E compatible system controller;
 a plurality of peripheral slots adapted to receive a plurality of peripheral modules;
 a reconfigurable switch fabric configured to create a variable number of PCI-E links between the system slot and the plurality of peripheral slots; and a nonvolatile memory storing a first switch image for a 2-link configuration of the reconfigurable switch fabric, and a second switch image for a 4-link configuration of the reconfigurable switch fabric.

2. The PCI-E system of claim 1, wherein the system slot and the peripheral slots are located on a backplane of a PXI-E chassis.

3. The PCI-E system of claim 2, wherein all of the peripheral slots on the backplane are hybrid-compatible PXI-E slots.

4. The PCI-E system of claim 3, wherein the reconfigurable switch fabric is located on a mezzanine card in the PXI-E chassis.

5. The PCI-E system of claim 3, further comprising at least one PCI to PCI-E bridge connected between the hybrid-compatible slots and the system slot.

6. The PCI-E system of claim 2, wherein the reconfigurable switch fabric is located on a mezzanine card in the PXI-E chassis.

7. The PCI-E system of claim 1, wherein the reconfigurable switch fabric is configurable to a 2-link PCI-E configuration of a PXI-E chassis, and is also configurable to a 4-link PCI-E configuration of a PXI-E chassis.

8. The PCI-E system of claim 1, wherein the reconfigurable switch fabric comprises two partitionable switches.

9. The PCI-F system of claim 1, wherein the system slot has a LINKCAP pin indicating the number of PCI-E links between the system slot and the plurality of peripheral slots, and PCI-F system dynamically controls the LINKCAP pin to indicate the number of PCI-E links.

10. A method of configuring a peripheral component interconnect express (PCI-E) compatible chassis comprising multiple PCI-E switches configured to establish PCI-E links between a system slot and multiple peripheral slots, the method comprising:

determining a number of PCI-E links to establish between the system slot and the multiple peripheral slots;

partitioning at least one of the multiple PCI-E switches upon determining that the link configuration requires a number of PCI-E links greater than the number of PCI-E switches; and     loading switch images to the PCI-E switches based on the determined number of PCI-E links.

11. The method of claim 10, wherein the multiple PCI-E switches comprise two reconfigurable PCI-E switches adapted to establish two PCI-E links or four PCI-E links between the system slot and the multiple peripheral slots.

12. The method of claim 10, further comprising:

controlling a LINKCAP pin of the system slot to indicate the number of PCI-E links.

13. The method of claim 10, wherein the chassis is a PXI-E chassis.

14. The method of claim 10, wherein the switch images are loaded to the PCI-E switches from a nonvolatile memory located in the chassis.

15. The method of claim 10, wherein determining the number of PCI-E links comprises receiving a user selection of the number of PCI-E links.

16. The method of claim 15, wherein the user selection is received via a software interface.

* * * * *

UNITED STATES PATENT AND TRADEMARK OFFICE
CERTIFICATE OF CORRECTION

PATENT NO. : 8,661,178 B2  
APPLICATION NO. : 13/191892  
DATED : February 25, 2014  
INVENTOR(S) : Jared Richard Page 1 of 1

It is certified that error appears in the above-identified patent and that said Letters Patent is hereby corrected as shown below:

In the Claims:

In column 8, line 61, in Claim 9, delete "PCI-F" and insert -- PCI-E --, therefor.

In column 8, line 64, in Claim 9, delete "PCI-F" and insert -- PCI-E --, therefor.

Signed and Sealed this  
Third Day of June, 2014

Michelle K. Lee  
*Deputy Director of the United States Patent and Trademark Office*